(12) United States Patent
Raymond et al.

(10) Patent No.: US 9,420,042 B2
(45) Date of Patent: Aug. 16, 2016

(54) FACILITIES MANAGEMENT SYSTEM

(71) Applicant: Raymond & Lae Engineering, Inc., Fort Collins, CO (US)

(72) Inventors: Donald M. Raymond, Fort Collins, CO (US); Rick Stelzer, Windsor, CO (US)

(73) Assignee: Raymond & Lae Engineering, Inc., Fort Collins, CO (US)

( * ) Notice: Subject to any disclaimer, the term of this patent is extended or adjusted under 35 U.S.C. 154(b) by 280 days.

(21) Appl. No.: 13/894,574

(22) Filed: May 15, 2013

(65) Prior Publication Data

US 2013/0311634 A1    Nov. 21, 2013

Related U.S. Application Data

(60) Provisional application No. 61/647,286, filed on May 15, 2012.

(51) Int. Cl.
| | |
|---|---|
| *H04L 29/08* | (2006.01) |
| *H04L 29/06* | (2006.01) |
| *G08B 7/06* | (2006.01) |
| *G06Q 10/06* | (2012.01) |
| *G06Q 10/00* | (2012.01) |

(52) U.S. Cl.
CPC ........... *H04L 67/12* (2013.01); *G08B 7/06* (2013.01); *H04L 29/06* (2013.01); *G06Q 10/00* (2013.01); *G06Q 10/063118* (2013.01)

(58) Field of Classification Search
None
See application file for complete search history.

(56) References Cited

U.S. PATENT DOCUMENTS

| | | | | |
|---|---|---|---|---|
| 5,937,163 | A * | 8/1999 | Lee .................. | G06F 17/30864 707/999.102 |
| 6,157,943 | A * | 12/2000 | Meyer ............... | H04L 29/06 709/203 |
| 7,027,808 | B2 * | 4/2006 | Wesby ............... | G06Q 40/00 340/853.1 |
| 2003/0233432 | A1 * | 12/2003 | Davis ................ | H04L 41/0253 709/222 |
| 2006/0109113 | A1 * | 5/2006 | Reyes ............... | G08B 7/06 340/541 |
| 2007/0195706 | A1 * | 8/2007 | Sink ................. | H04L 12/24 370/250 |
| 2008/0313006 | A1 * | 12/2008 | Witter .............. | G06Q 10/063118 705/7.17 |
| 2009/0234512 | A1 * | 9/2009 | Ewing .............. | H04L 12/10 700/295 |
| 2012/0131217 | A1 * | 5/2012 | Delorme ........... | G06Q 10/06 709/230 |
| 2012/0166616 | A1 * | 6/2012 | Meehan ............ | G06Q 10/0639 709/224 |
| 2012/0310602 | A1 * | 12/2012 | Jacobi .............. | G06F 17/5004 703/1 |
| 2013/0173062 | A1 * | 7/2013 | Koenig-Richardson | G06Q 10/00 700/275 |

\* cited by examiner

*Primary Examiner* — Ranodhi Serrao
*Assistant Examiner* — James Fiorillo
(74) *Attorney, Agent, or Firm* — William W. Cochran; Cochran Freund & Young LLC

(57) ABSTRACT

Disclosed is a facilities management system that utilizes embedded maps in nested facilities management devices. The facilities management devices are connected to a network and are linked in map images that indicate the location of the facilities management devices, as well as the locations of sensors. In addition, the links indicate the existence of an alarm condition, so that users can drill down on the links to locate a sensor that has created the alarm condition. The facilities management system utilizes various management systems and various protocols to provide a wide range of options for facilities managers.

8 Claims, 13 Drawing Sheets

800
Flow Chart for Configuring a Floor Map

FACILITIES MANAGEMENT SYSTEM

CROSS-REFERENCE TO RELATED APPLICATION

The present application is based upon and claims the benefit of U.S. Provisional Patent Application No. 61/647,286, entitled "Facilities Management System", filed May 15, 2012, by Donald M. Raymond and Rick Stelzer. The entire content of the above-mentioned application is hereby specifically incorporated herein by reference for all it discloses and teaches.

BACKGROUND OF THE INVENTION

Facilities management systems have been used for various purposes to assist in keeping track of the operation of systems and equipment in facilities such as buildings, clean rooms, computer data centers, etc. Facilities management systems can alert building managers, systems administrators who oversee the operation of systems, building owners, individual users and others in identifying problems and potential problems, as well as automatically activating systems for preventing damage. For example, a leak detection system may detect a leak in a facility and automatically turn off the water supply to prevent damage. A data center may detect a high temperature on a particular rack and adjust the air conditioning system to compensate for the higher temperatures. Of course, there are many examples of these types of operations.

SUMMARY OF THE INVENTION

An embodiment of the present invention may therefore comprise a method of monitoring and managing systems in a facility comprising: connecting a first facilities management device to a network with an address on the network; embedding a first map image in the facilities management device; connecting additional facilities management devices to the network that have additional addresses; embedding additional map images in the additional facilities management devices by accessing the additional addresses; placing links on the first map image that indicate a location of at least one of the additional facilities management devices and an operational state of a sensor coupled to the at least one of the additional facilities management devices An embodiment of the present invention may further comprise a facilities management system comprising: a first level facilities management device that is connected to a network at a specified address that contains a first embedded map image; additional facilities management devices connected to the network at additional connection levels to the first level facilities management device that have additional embedded map images; at least one first level embedded link on the first embedded map image that links to at least one of the additional facilities management devices, the at least one first level embedded link disposed on the first embedded map image at a position that indicates a location of the at least one of the additional facilities management devices and an operational stage of a sensor linked to the at least one of the additional facilities management devices; at least one additional level embedded link disposed on the additional embedded map images that links to the at least one of the group comprising the an additional facilities management device and a sensor, the at least one additional level embedded link disposed on the additional embedded map images at a location of at least one of the group comprising the additional facilities management device and the sensor and an operational state of at least one of the group comprising a sensor linked to the additional facilities management device and the sensor.

DETAILED DESCRIPTION OF THE EMBODIMENTS

Figure 1:
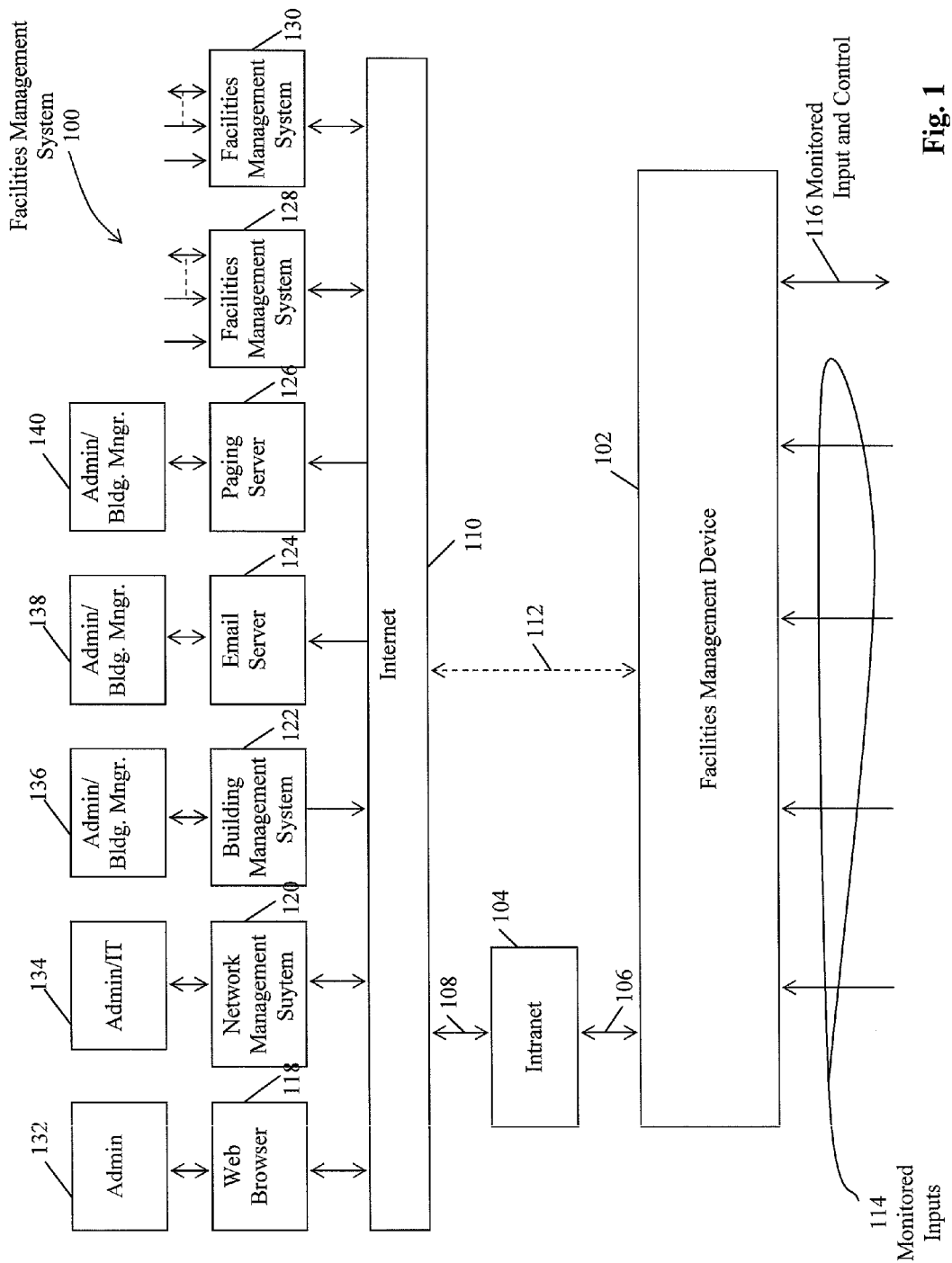
FIG. 1 is a schematic diagram of an embodiment of a facilities management system.

FIG. 1 is a schematic diagram of a facilities management system 100. As illustrated in FIG. 1, the facilities management system 100 includes a facilities management device 102. The facilities management device 102 may be connected to an intranet, such as a network within a building or other local network via connection 106. The intranet 104 may then be connected to the Internet 110 via a connection 108. Alternatively, the facilities management device 102 may be connected directly to the Internet via connection 112. The facilities management device has a series of monitored inputs 114. As set forth below, the monitored inputs 114 may monitor numerous different types of inputs including thermostats, voltage meters, current meters, breaker boxes, leak detection devices, heating and air conditioning systems, operational conditions of equipment and other well-known monitored devices. In addition, facilities management device 102 may have one or more I/O ports or connections through an intranet or Internet that monitors other types of inputs and provides controls for operating devices via connection 116.

The information that is monitored and managed by a facilities management device 102, illustrated in FIG. 1, can be accessed via Internet 110 by numerous different types of communication devices. For example, web browser 118 can access the facilities management device 102 and provide information to an administrator 132 or other individuals such as a building manager, building owner, house owner or other interested party. A network management system 120 that may typically be used with facility management devices can be coupled to the facilities management device through the Internet 110. The network management system 120 provides information to an administrator, IT person 134, or other person, regarding the status of systems monitored by the facilities management device 102. In addition, many buildings are equipped with well-known building management systems 122 that can interface with the facilities management device 102. An administrator or building manager can determine operational parameters, determine alarm conditions and operate systems using the building management system 122. An email server 124 may also be coupled to the facilities management device 102 via Internet 110 to provide email alerts regarding alarm conditions that may exist to various people on a distribution list. These email alerts can be emailed to any party of interest including an administrator, building manager 138 or other party responsible for monitoring alarm conditions. A paging server 126 may also be coupled through the Internet 110 to the facilities management device 102. When an alarm condition exists, the facilities management device 102 may send an alarm condition message via connection 112 through Internet 110 and through the paging server 126 to an administrator/building manager or other person 140 who is responsible for monitoring and managing building systems. In addition, the facilities management systems 128, 130 can be coupled to the facilities management device 102 to form a nested network of facilities management devices, which can provide graphic information and other status information regarding numerous linked facilities management devices.

Figure 2:
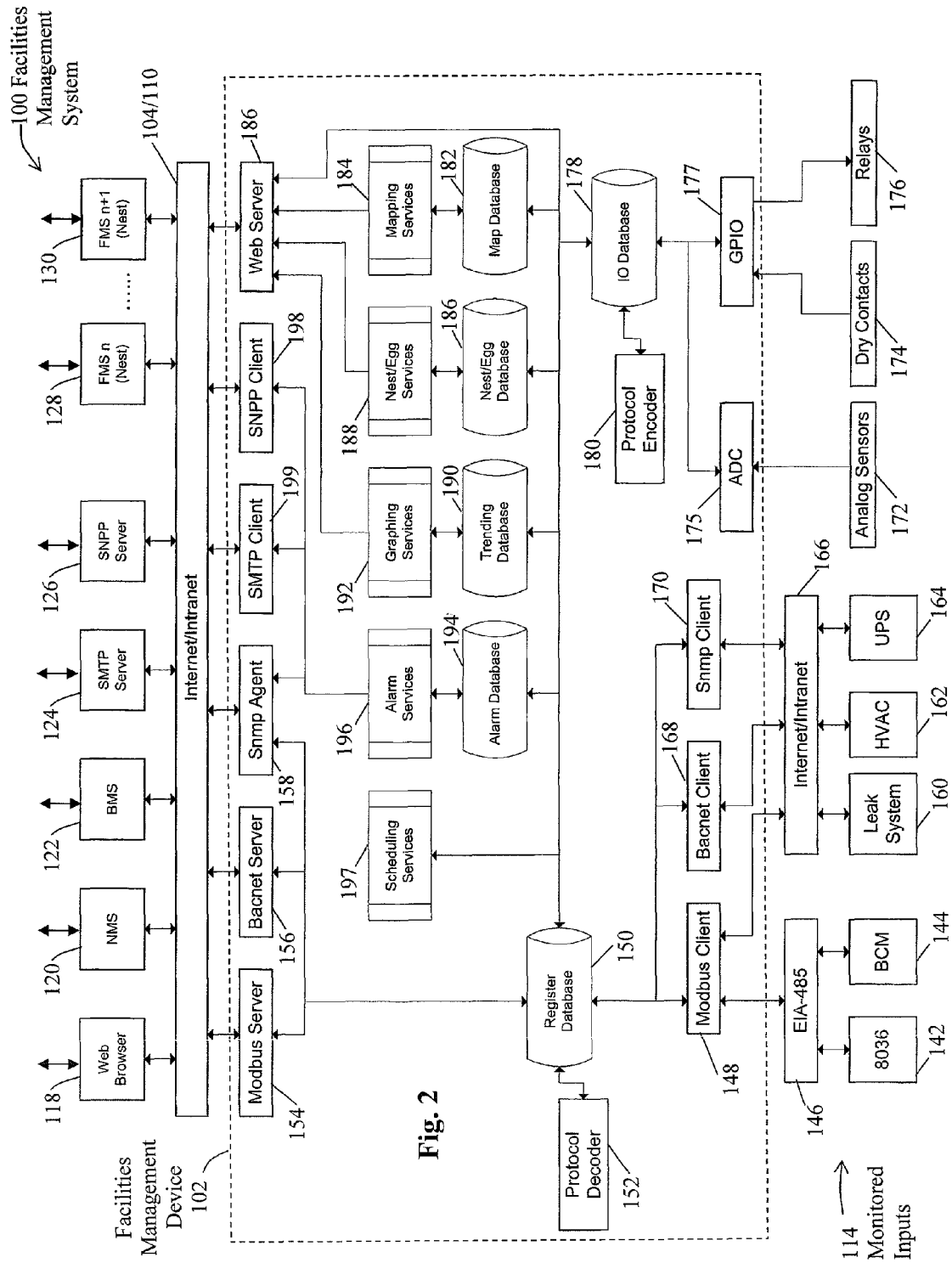
FIG. 2 is a more detailed diagram of the embodiment of FIG. 1.

FIG. 2 is a more detailed illustration of the embodiment of FIG. 1 of a facilities management system 100. As illustrated in FIG. 2, facilities management device 102 includes various hardware and software systems for performing monitoring and control functions. A primary feature of the facilities management system 100 is that the facilities management device 102 generates a web displayable file (web page) in hypertext markup language (HTML), which is generated and updated to reflect current conditions of facility sensors and facility subsystems. The web page includes a 10 second automatic upload of current sensor and subsystem alarms as color-coded icons. The web-based facility management system 100 manages and monitors critical systems and various facilities. An example of a facility may be a data center. The use of a web-based management interface allows flexibility and easy access to facilities management devices and a nesting network of other connected facilities management devices 128, 130. In that regard, the facilities management system 100, illustrated in FIG. 2, provides a web-based embedded facility management system that accepts external sensors, serial communications to Modbus enabled systems and Ethernet IP/ECP communications to Modbus/TCP and SNMP enabled systems. A user-supplied graphic image, such as a floor plan or geographical map can be uploaded by a user or administrator via a facilities management system web page provided by the facilities management device 102. Each external sensor location on the graphic image can be selected by a user or administrator via a simple web page by clicking the location on the graphic image of the location of a sensor. Additionally, geographical map images can be uploaded as a web page in the facilities management device 102, which can contain locations and links to other facilities management systems in a nest such as FMS 128, FMS 130. The map image may contain a link which provides access to the additional FMS system.

Referring again to FIG. 2, the facilities management device 102 includes a general purpose I/O chip 176 that transmits and receives general purpose input/output signals. For example, dry contacts 174 is a digital signal that relays from other units, such as thermostats or other devices. The general purpose I/O device (GP 10) 177 may also transmit signals to relays 176, or other control devices, for operation of those relays or control devices. In this manner, systems can be controlled by the facilities management device 102. Information from relays 176, or other control devices, may also be transmitted to the general purpose I/O device 177. Digital data from the dry contacts 174 and relays 176 that are received by the general purpose I/O device 177 are transmitted to the I/O database 178. The information is stored in the I/O database 178 and encoded by the protocol encoder 180. For example, the protocol encoder 180 may encode the data into an HTML protocol. Analog sensors 172 may comprise door switches, temperature sensors, humidity sensors or other analog sensors. Other examples include a power sensor that provides an analog output. Battery current and voltages may also be sensed by analog sensors 172 in cell towers and other telephone relay stations, etc. Analog to digital converter (ADC) 175 then converts the analog data to digital data, which is then transmitted to the I/O database 178. I/O database 178 is a temporary database, which stores alarm conditions and transfers the information to the register database 150. The register database has individual embedded registers that store information from each of the sensors, such as analog sensors 172 and dry contacts 174 as well as the monitored inputs 114.

As also shown in FIG. 2, 8036 monitor 142 can be used to provide information regarding building power systems. For example, 8036 monitor 142 is used in a facilities power room and measures voltage, current and power utilized by the building. The 8036 monitor 142 has an EIA-485 connection that provides output data to the outside of the power room. The 8036 monitor is normally a self-contained box and may be contained within the high voltage cage in the power room of a building. The 8036 monitor is present in many large buildings and is a frequently used system that is normally installed by an electrician in the high voltage cage of a building. The EIA-485 output is normally a twisted pair that connects through the EIA-485 port 146 that is connected to the facilities management device 102. Branch circuit monitor (BCM) 144 is a system that connects to a circuit breaker box that provides information regarding the status of each breaker within the circuit breaker box. These systems are also normally installed by an electrician and have an EIA-485 output. The EIA-485 output from the BCM 144 is also coupled to the facilities management device 102, which provides information regarding the status of each of the breakers in the breaker box. The EIA-485 data is transmitted to a Modbus client 148. The Modbus client 148 is software that runs in the facilities management device 102 that uses a Modbus protocol, which is a serial communications protocol that was published by Modicon in 1979. Protocol is for use with programmable logic controllers (PLCs) and is a de facto standard communication protocol that is commonly available for connecting industrial electronic devices. Modbus allows for communication between up to 240 devices that are connected to the same network. For example, systems for measuring temperature and humidity can be connected to a Modbus network and the results can be communicated to a processing system for display. Most Modbus devices communicate over a serial EIA-485 physical layer. For example, the Modbus client 148 interconnects with the EIA-485 port 146 to obtain electrical power information from 8036 module 142 and BCM module 144, but can interface with other well known systems. The EIA-485 port 146 connection is a serial port that may use Ethernet or other networks that support an Internet protocol suite. Referring again to FIG. 2, the Modbus data from Modbus client 148 is communicated to the register database 150 and stored in the register database 150. For example, the current rating of a facilities power system that is monitored by the 8036 module 142 may be stored in one register. The voltage reading may be stored in another register. The status of a particular circuit breaker transmitted by the branch circuit monitor 144 may be stored in another register. The status of another circuit breaker may be stored in still another register. All of this information is transmitted via the Modbus client 148 in accordance with the Modbus protocol and stored in the register database 150. Further, leak system 160 may provide information regarding one or more leak sensors to a network 166, such as an Internet or intranet network 166. Similarly, monitors disposed in a heating, ventilation and air conditioning system (HVAC system) 162 may transmit information to network 166. Also, information from uninterruptable power supplies (UPS) 164 can also be supplied via an Ethernet connection to network 166. Network 166 may communicate this information to the Modbus client 148, which translates the information into a Modbus protocol. The Internet or intranet network 166 can also transmit the data from the leak system 160, the HVAC system 162 and the UPS system 164 to a BACnet client. BACnet is a communications protocol for building automation and control networks that is an ANSI and ISO standard protocol. BACnet was designed to allow communication of building automation and control systems for applications such as heating, ventilating and air conditioning control, lighting control, access control and fire detection systems and associated equipment. The BACnet protocol provides mechanisms for computerized building automation devices to exchange information regardless of the particular building service that the devices perform. The BACnet protocol was developed in 1987. Many HVAC controls companies incorporate BACnet into a HVAC controls so that it is a common protocol used at least in HVAC systems. The Internet/intranet network 166 is also coupled to a SNMP client 170. The SNMP client is software running on the facilities management device 102 that translates the data from the leak system 160, HVAC system 162 and UPS devices 164 into the simple network management protocol (SNMP). SNMP is an Internet standard protocol for managing devices on an Internet Protocol (IP) network. Devices that typically support SNMP include routers, switches, servers, workstations, printers, modem racks and other devices. SNMP is mostly used in network management systems to monitor network attached devices (typically routers, hubs, etc.) for conditions that warrant administrative attention. SNMP is a component of the Internet protocol suite, and it consists of a set of standards for network management including an application layer protocol, a database schema and a set of data objects.

As also illustrated in FIG. 2, Modbus server 154 is coupled to the register database 150. Modbus server 154 retrieves data from the data register 150 that is stored by the Modbus client 148. This data may comprise the power management system data from 8036 module 142 or the branch circuit monitor module 144 that monitors circuit breakers. In addition, data from leak system 160, HVAC system 162 and UPS devices 164 can also be translated to the Modbus protocol as described above. The Modbus server 154 delivers the data to the Internet/intranet 104/110. The Modbus server 154 may also include an interface for interfacing with web browser 118, network management system 120 and building management system 122. The network management system 120 is a combination of hardware and software that is used to monitor and administer various devices connected to the network 104/110. The building management system 122 is a computer-based control system installed in buildings that controls the monitors of the buildings' mechanical and electrical equipment, such as ventilation, lighting, power systems, fire systems and security systems. The BMS system 122 includes software and hardware. Internet protocols and other open standards may be used in conjunction with the BMS system 122, including the Modbus standard. Similarly, the BACnet server 156 retrieves data from the register database 150 stored by BACnet client 168. Typically, the building management system 122 would interface with the BACnet server. SNMP agent 158 interfaces with register database 150 and retrieves data stored in the register database 150 in the SNMP protocol. Data stored by the SNMP client 170 in the register database 150 is accessed by the SNMP agent 156. Network management system 120 would typically interface with the SNMP agent 158. SMTP client 199 uses an email protocol that interfaces with the SMTP server 124. SMTP client 199 receives alarm signals stored by the alarm database 194 and processed by the alarm services module 196. If an alarm condition is created, such as, for example, if a point goes above a certain threshold, the alarm database 194 is updated. The alarm services module 196 notifies the SNMP agent, SMTP client and the SNPP client of the alarm condition. For example, the alarm services module 196 sends the SNMP agent an SNMP trap, which is transmitted to the network management system module 120 to indicate an alarm. In this manner, the network management system 120 receives alarms from devices and does not have to actively poll any of these devices to determine if an alarm condition exists. Consequently, the network management system 120 can monitor thousands of nodes without polling the nodes. Since the network management system 120, which relies upon the SNMP protocol, is designed for managing routers, hubs, servers, etc., the network management system 120 is ideally suited for monitoring a large number of devices.

The SMTP client 199, illustrated in FIG. 2, generates an email that is transmitted to the network 104/110 and then to the SMTP server 124, which is an email server. An email is then transmitted to a distribution list that indicates information regarding the alarm condition. For example, a link to a HTML page indicating the location of the alarm can be provided through the email. The SNPP client 198 transmits an alarm condition to the SNPP server 126. The SNPP server 126 generates a page that pages one or more individuals indicating an alarm condition.

Figure 4:
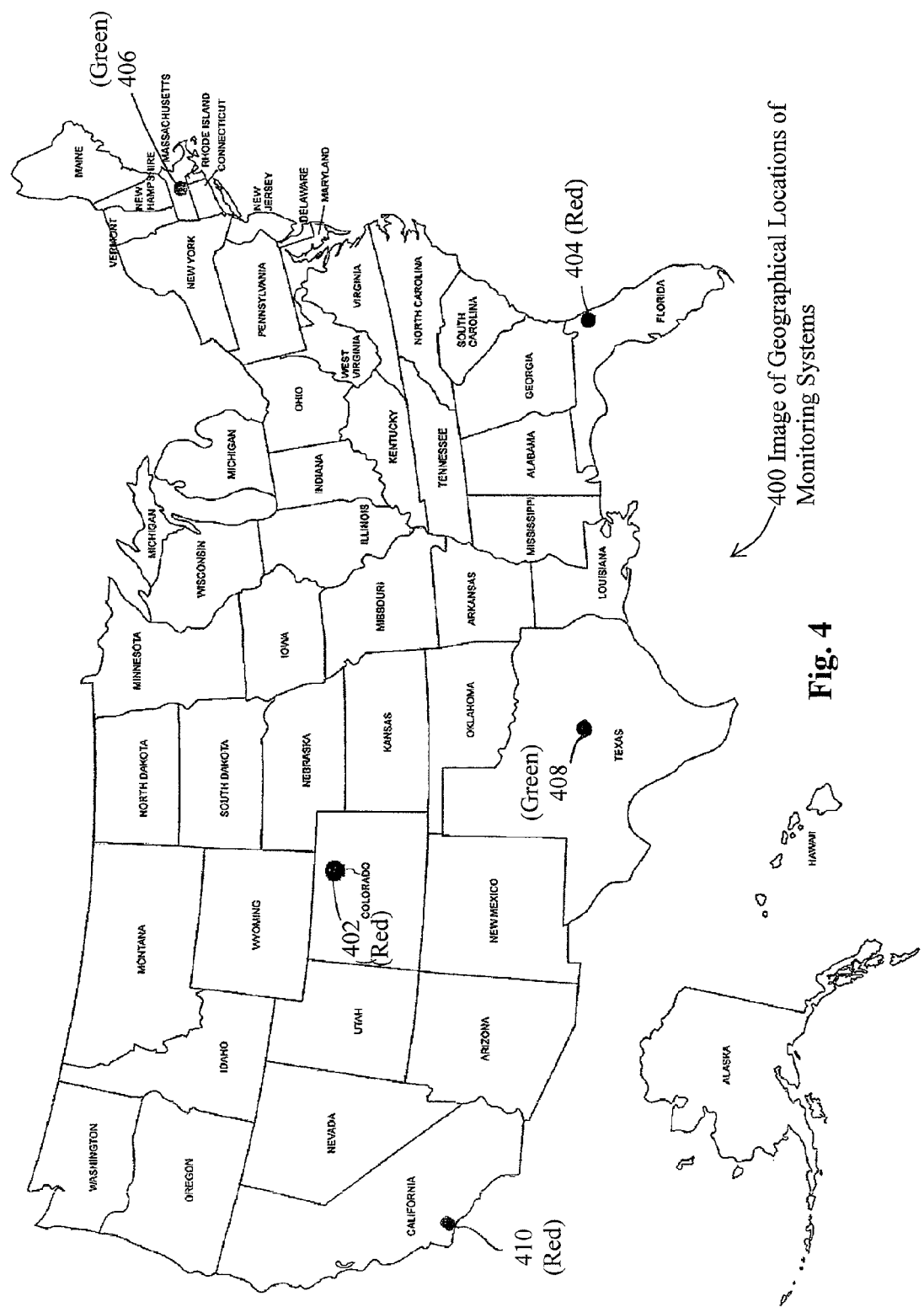
FIG. 4 is a graphic illustration of the United States showing the locations and the status of various management systems.
Figure 5:
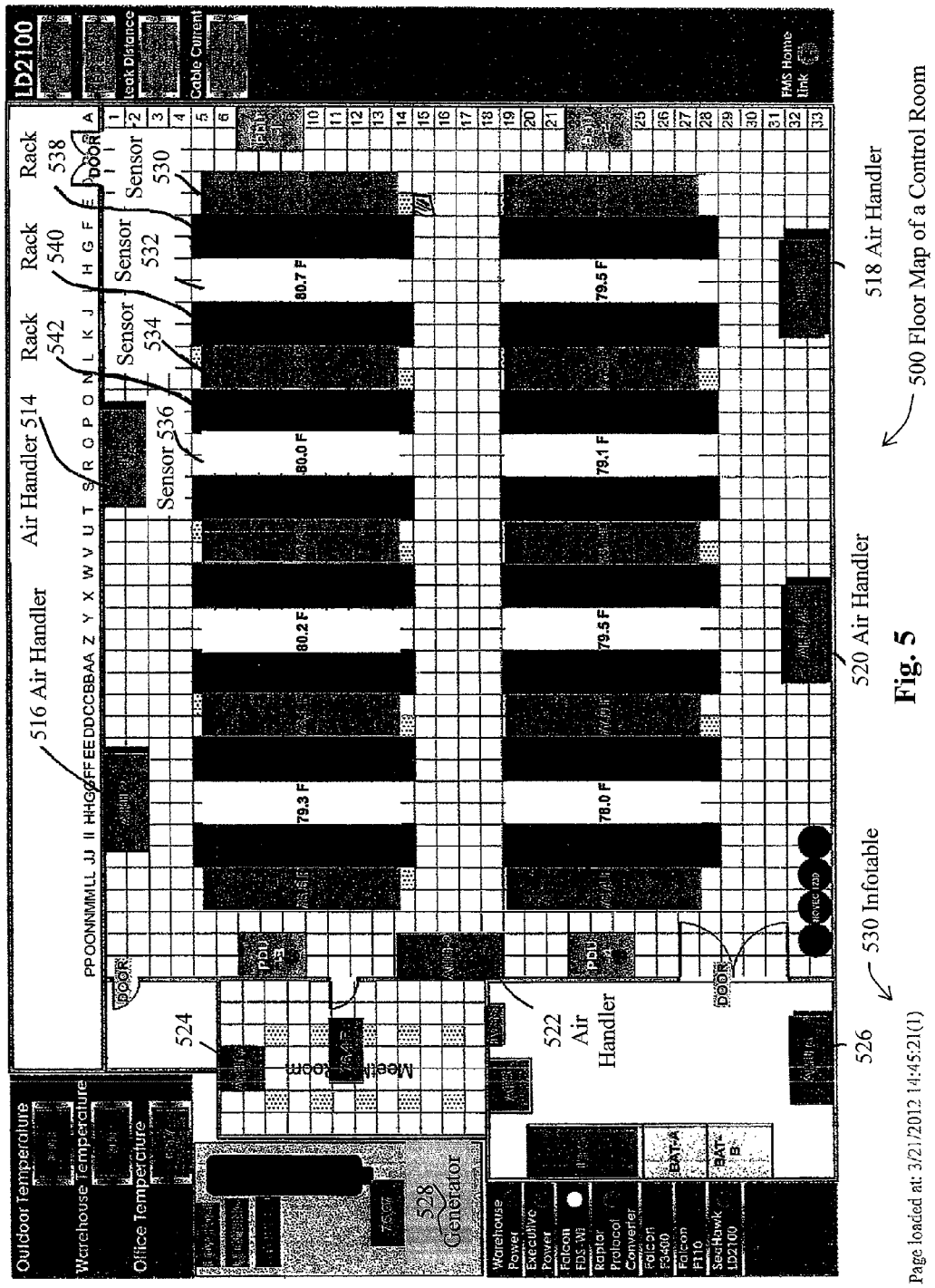
FIG. 5 is an example of a floor map illustrating the location of a plurality of sensors.

Web server 186, illustrated in FIG. 2, interfaces with the web browser 118 using standard HTTP protocol. The map database 182 provides a HTML web page that can be accessed by the web browser 118 via mapping services 184. Examples of web pages are illustrated in FIGS. 4 and 5. In the initial process of setting up the facilities management system 100, web browser 118 loads an image, such as a JPEG image, in the map database 182. The mapping services 184 utilize the image in a HTML web page, which interfaces with the web server 186. Upon accessing the web server 186, a web browser, such as web browser 118, enters the IP address of the facilities management device 102 to access the web server 186 and then enters a user name and password or uses other security features to access the HTML, web page. The image can take the form of a JPEG, GIF or other image data that is scanned or otherwise generated and loaded into the web browser 118 for transmission through the network 104/110 to the web server 186 and the map database 182. The mapping services 184 obtains information from the register database 150 and I/O database 178 that indicates the status of the various monitored inputs 114, analog sensors 172, dry contacts 174 and relays 176. Mapping services 184 allows a user or administrator 132 to access the HTML page and enter locations of the sensors and monitored inputs 114 on the map, as explained in more detail below. The HTML page is embedded in the map database 182 in the facilities management device 102 so that an additional PC or other computing devices not needed to access an image.

As also illustrated in FIG. 2, a trending database 190 is coupled to the register database 150 and the I/O database 178. The trending database is a small database that records sensor data from the monitored inputs 114 over a period of time. The data is logged periodically, such as every five minutes or every hour, and stored in the trending database 190. A graphics package is provided in the graphing services 192 that generate a graph for display via the web server 186. The graph illustrates the trends of the data collected by the sensors over a period of time, such as 30 days or a year, depending upon the size of the trending database 190 and the logging interval. Java tools can be used to generate a graph for display of the trending data in the web browser 118.

The nest/egg database 186 of FIG. 2 is coupled to the map database 182 and the web server 186. In addition, the nest/egg database is coupled to the nest/egg services module, which is also connected to the web server 186. The nest/egg database 186 and nest/egg services 188 provide interactive links on the HTML web page generated by the mapping services 184. The nest/egg services module provides a link that links the web browser 118 to one or more additional nested facilities management systems 128, 130. Each of the facilities management systems 128, 130 has the same architecture as the facilities management system 100 illustrated in FIG. 2 so that multiple nested levels of facilities management systems can be linked in a hierarchical system. In this manner, thousands of facilities management systems can be nested together and provide HTML web pages at each level. For example, the facilities management systems 128, 130 may theoretically comprise an unlimited number of facilities management systems. Each one of those facilities management systems can also have 32 number of facilities management systems. Further, each one of those can have 32 number of facilities management systems and so on. At each level, a link can be provided on a HTML graphic web page that can access the facilities management system at the next lower level. If any of the facilities management systems in a particular string of connections has an alarm condition, each of the links will indicate the alarm condition all the way up to the top level facilities management system 100. For example, if a lower level facilities management system has an alarm condition, a link on the HTML web page of the facilities management system 100 will indicate red. Upon clicking that link, at least one of an additional number of links will indicate an alarm condition, and so on, until the user drills down to the point where a particular sensor is shown in an alarm condition. Each of the facilities management systems includes the embedded web page that has a map of the location of additional facilities management systems or alarm sensors, as disclosed in more detail below.

Figure 3:
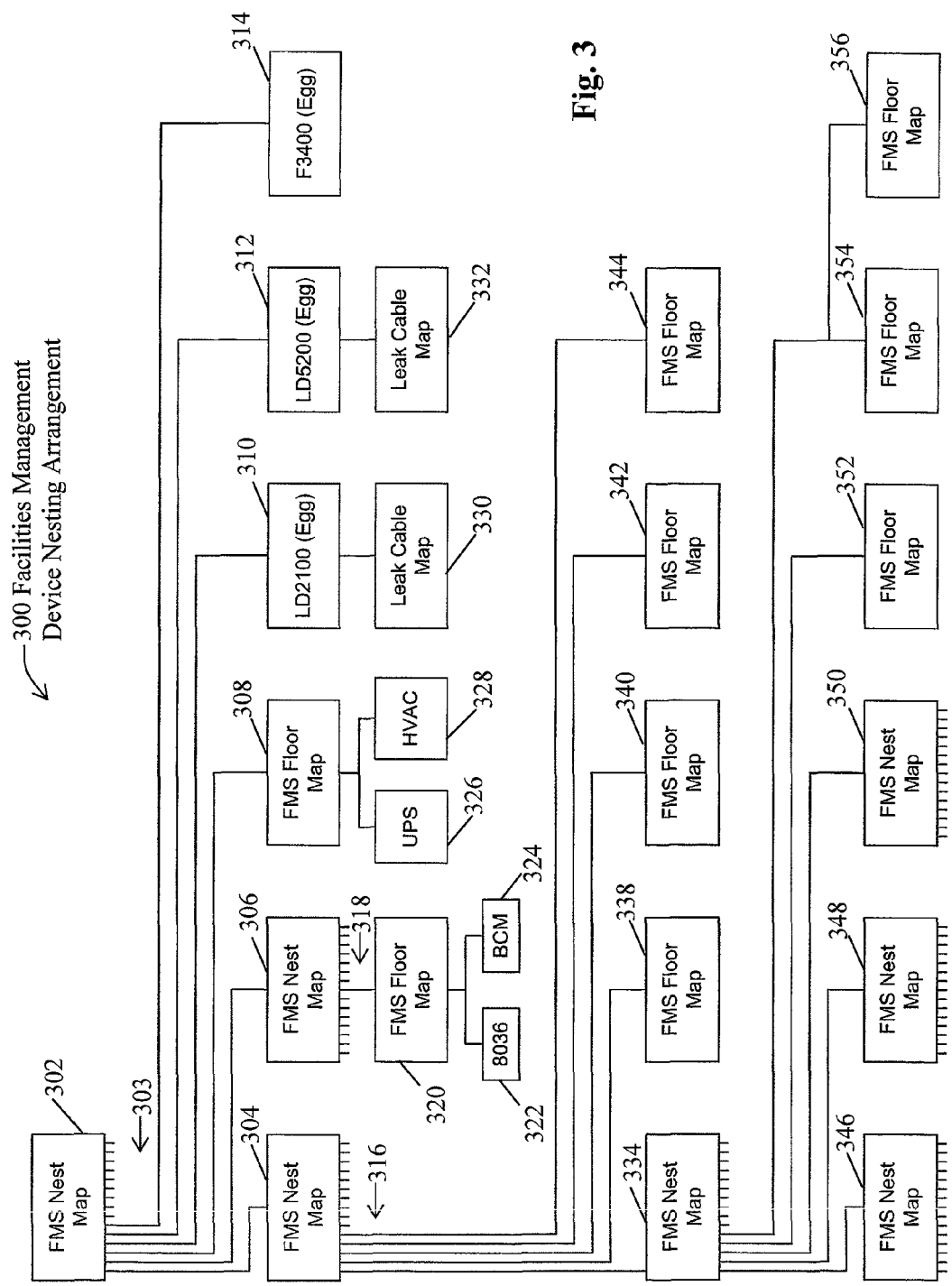
FIG. 3 is a schematic diagram of an embodiment for nesting of facilities management devices.

FIG. 3 is a schematic diagram of a facilities management system nesting arrangement. As illustrated in FIG. 3, a top level FMS nest map 302 has links 303 to a number of other devices. FMS nest map 302 links to FMS nest map 304, FMS nest map 306, FMS floor map 308, facilities monitor 310 labeled LD2100, a facilities monitor 312 labeled LD5200 and a facilities monitor 314 labeled F3400. Each of the devices 310, 312, 314 is labeled as an egg, since these are leak detectors that are not nested to other FMS devices. Leak detector 310 is connected to a leak cable map 330 that indicates the location of a leak in a facility. Leak detector 312 is also connected to a leak cable map 332. FMS nest map 306 has a plurality of links 318. One of those links goes to a FMS floor map 320 that indicates the location of an 8036 power monitoring module 322 and branch circuit monitor 324 that monitors the breakers for various circuits within a building. FMS floor map 308 illustrates the location of uninterruptable power supplies 326, the status of the uninterruptable power supply and the status of an HVAC system 328. FMS nest map 304 has a plurality of links 316 at a second level that illustrates various floor maps at a third level. For example, FMS nest map 304 indicates the location and status of a plurality of FMS floor maps 338, 340, 342, 344. In addition, FMS nest map 304 links to an additional FMS nest map 334. FMS nest map 334 has a plurality of links 336 to additional FMS nest maps 346, 348, 350 at a fourth level. In addition, FMS nest map 334 has links 336 to FMS floor maps 352, 354, 356. FMS nest maps 346, 348 have links 358, 360, respectively, that can link to additional FMS nest maps or to floor maps. In this manner, the nesting of facilities management devices that each have their own embedded web page can continue through multiple layers to provide a very large number of facilities management systems that are all linked together.

FIG. 4 is an example of an image 400 of geographical locations of various facilities management systems. The image 400 may correspond to a top level image, such as the FMS nest map 302, illustrated in FIG. 3. As illustrated in FIG. 4, there are several dots that comprise links to additional levels in a nest map configuration. As illustrated in FIG. 4, link 402 is geographically indicated as being located in Fort Collins, Colo. Link 404 is located in St. Augustine, Fla. Link 406 is located in Boston, Mass. Link 408 is located in Dallas, Tex. Link 410 is located in Los Angeles, Calif. Assuming that the facilities management system 100 is located in Fort Collins, Colo. at link 402, link 402 may indicate red, since other nested links may also have a red condition. Red is used as an example of an alarm condition that may exist in one of the connected facilities management systems. Link 404 in St. Augustine, Fla. indicates a red status, and link 410 in Los Angeles, Calif. also indicates a red condition. Links 406 and 408 are green conditions. Clicking on link 410 in Los Angeles, Calif. or link 404 in St. Augustine, Fla. may bring up other maps. For example, if there are numerous other facilities management systems that are located around the City of Los Angeles, a separate map may come up which shows multiple other building locations where facilities management systems exist. At least one of those links on a map of Los Angeles will indicate a red condition. For example, if one of the links is for a building located in Anaheim, Calif., that is indicated as red, the user can click on that red link and bring up a building in Anaheim. By clicking on a red link for a building in Anaheim, an additional image may come up which illustrates a side view of the building with multiple floors. An additional link on one of the floors may indicate red. By clicking on the red link for a particular floor, a floor map may appear, such as illustrated in FIG. 5. At each level, a separate FMS system exists that includes the embedded image.

FIG. 5 is an illustration of a floor map 500 of a control room. The floor map 500 is one example of a floor map that illustrates a control room, the control room contents and various sensors located in the control room. As shown in FIG. 5, there are a plurality of air handling units 514, 516, 518, 520, 522, 524, 526 that normally provide cooling to the control room illustrated in the floor map 500. Each of these air handling units 514-526 includes a sensor that senses the operation of the air handling unit. If one of the air handling units 514-526 is not operating properly and is not providing cooling air, the sensor in the air handling units 514-526 indicates an alarm condition and the floor map 500 indicates a red square around the air handling unit. For example, if air handler 520 stops operating, the square marked AHU-4 will appear as red on the floor map 500. In this manner, it is easy to identify a problem with a particular sensor that will then cause the link in the next level up, which is the side view of the building, to indicate a red link for the particular floor of the floor map 500. Similarly, the link from the map of Los Angeles will show a red dot on Anaheim where the building is located. The link 410 in FIG. 4 will also indicate red since air handler 520 is not operating properly. An administrator, user, building manager, building owner or other person viewing the various maps through the web browser 118 of FIG. 1 can drill down through the various maps for any link that is indicated red to find the problem. For example, in FIG. 4, link 404 in St. Augustine, Fla. indicates red. There may be only a single building and a single floor that is being monitored in a building in St. Augustine, Fla. In that case, by clicking on link 404, which is red, a floor map such as the floor map illustrated in FIG. 5 may appear showing air handler unit 520 as red and not operating. FIG. 5 also illustrates infotable information 530 that denotes the time of the page load and the number of refreshes of data that have occurred (in parentheses), so that the viewer can be assured that the data is current.

As also illustrated in FIG. 5, there are a series of racks located in the control room that are shown on the floor map 500. For example, FIG. 5 illustrates racks 538, 540, 542. On each side of the racks are sensors 530, 532, 534, 536. An air handling unit provides cool air, which is detected by sensor 530 that has a temperature of 71.3° F. The equipment on the rack 538 sucks the cool air through the rack 538, which is exhausted on the opposite side of rack 538. A sensor 532 detects the temperature of the air leaving the rack 538. As illustrated in FIG. 5, sensor 532 detects the air emitted from rack 538 as having a temperature of 80.7° F. An air return is located near sensor 532 to pull the air emitted from the rack 538 through an air handling unit, such as air handler 514, to cool the air so it can be returned to the location of the sensor 530. Similarly, cool air may be provided at the location of sensor 534, which is drawn through racks 540, 542 for cooling. The output of rack 540 is located at sensor 532, which indicates that the air emitted from rack 540 has a temperature of 80.7° F. Similarly, the air emitted by rack 542 is detected by sensor 536 and has a temperature of 80.0° F. A return near sensors 532, 536 allows the heated air to pass through air handler 514 for further cooling. If the temperature detected by sensors 530, 532, 534, 536 and other sensors located on the floor map 500 exceed a certain threshold, an alarm condition will be indicated and the rectangles around these sensors will turn red. When a user clicks on the floor map 500, the user can easily spot the red conditions and take actions to remotely turn off certain equipment or send a technician to correct the problem. FIG. 5 also illustrates a generator 528 that has a sensor to indicate the status of the generator 528.

Figure 6:
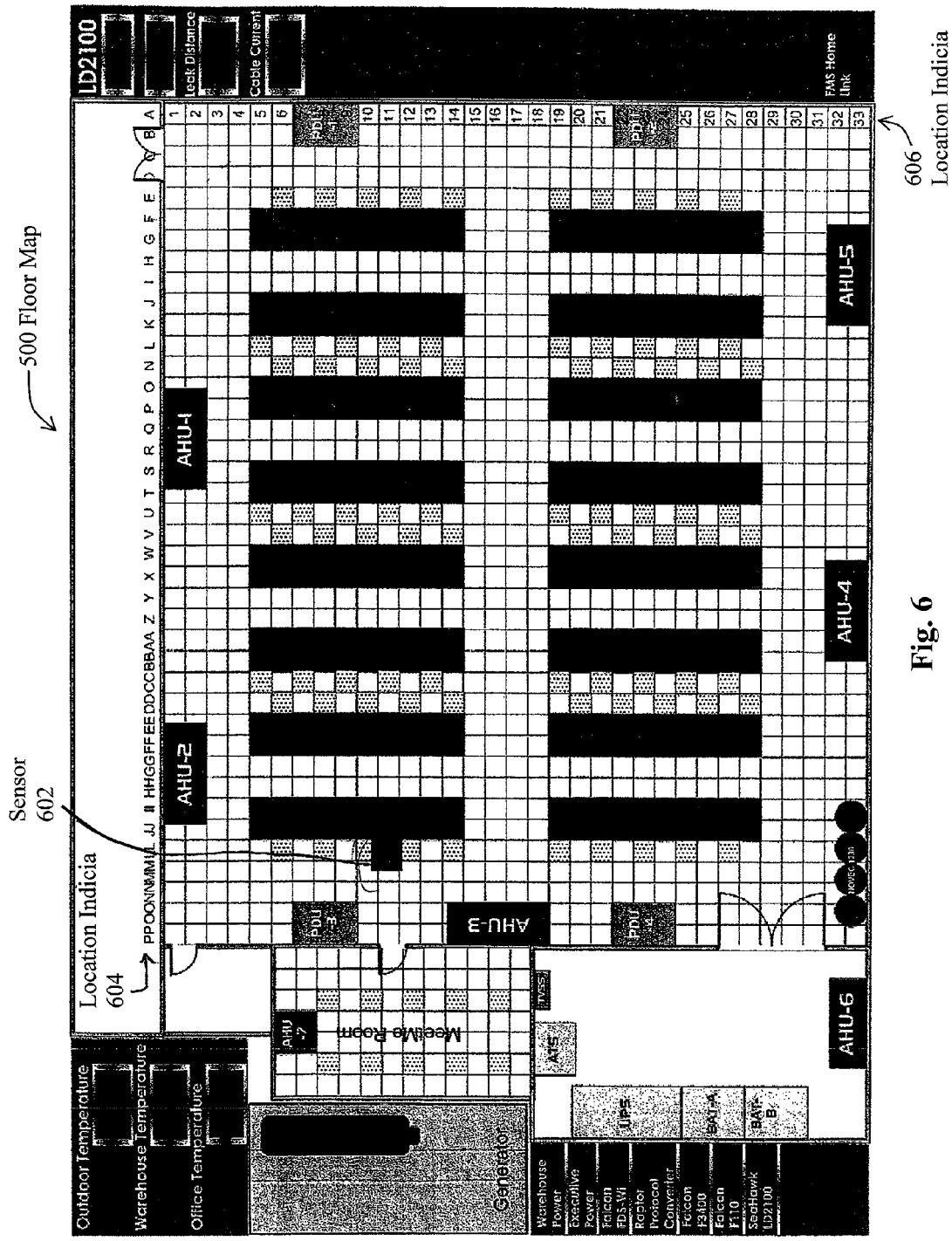
FIG. 6 is a graphical representation of the floor map of the embodiment of FIG. 5 illustrating the manner of locating sensors.

FIG. 6 is another illustration of the floor map 500 illustrated in FIG. 5 prior to locating the sensors on the image. As illustrated in FIG. 6, location indicia 604, 606 are disposed on the edges of the floor map 500. In this manner, the indicia can positively locate the location of a sensor, such as sensor 602. In a process of locating the sensors, a user or administrator may use a cursor to locate the position of a sensor, such as sensor 602. Upon clicking on a location, the location indicia 604, 606 are recorded. The size of the sensor box can be adjusted by the administrator or user of the system. In this manner, the sensors can be located on the floor map 500 by a user or administrator so that when an alarm condition exists, such as described with respect to FIG. 5, the location of the sensor reporting the alarm condition can be located on floor map 500.

Figure 7:
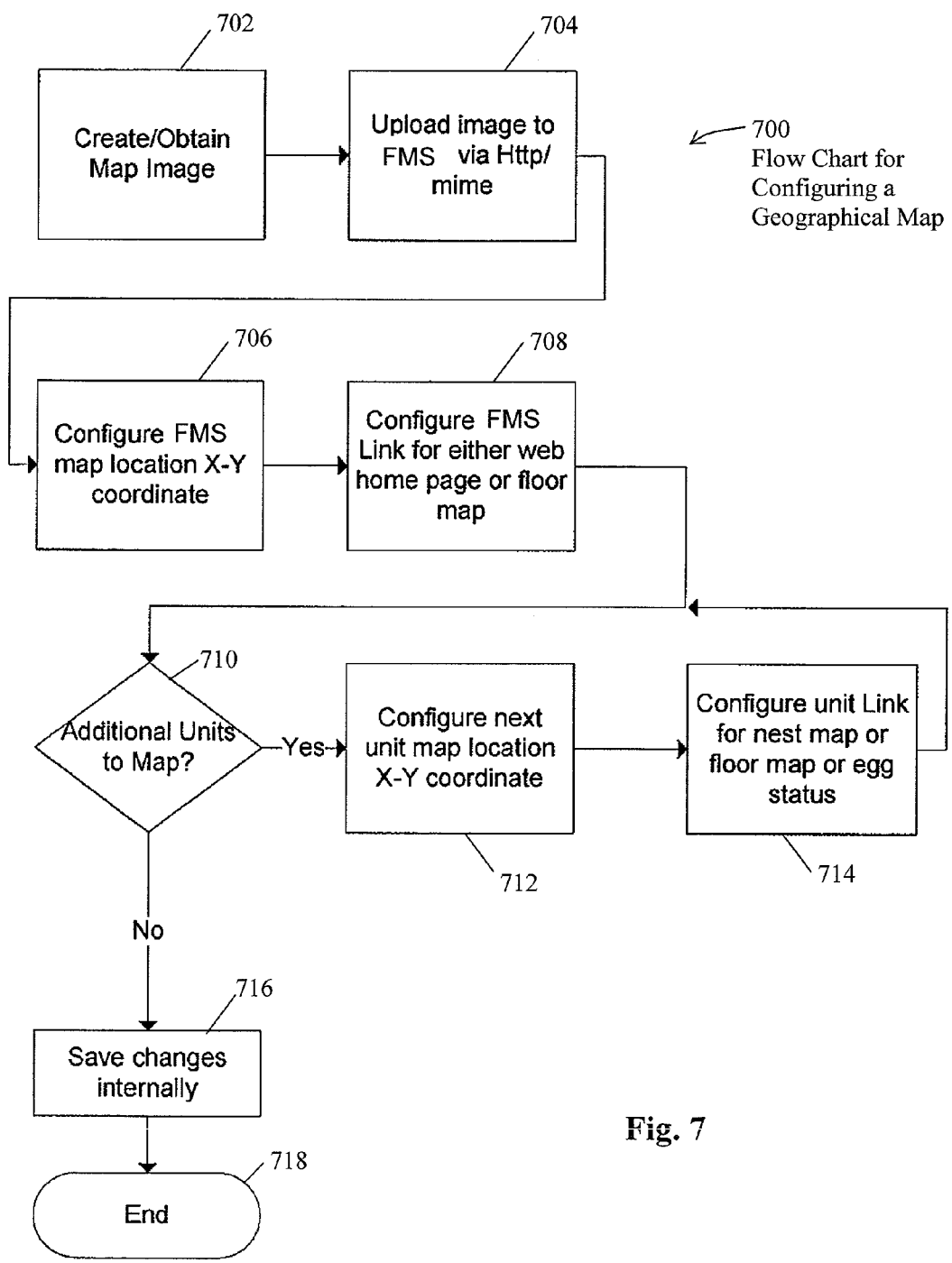
FIG. 7 is an embodiment of a flow diagram for configuring a geographical map in a facilities management system.

FIG. 7 is a flow chart 700 for configuring a geographical map, such as the image 400 of a geographical map of FIG. 4. At step 702, a geographical map is either created or obtained as an image. This can occur by scanning an image or picture to generate a JPEG image, a GIF image or other type of digital image. Photographs can also be used, which may be in the form of a JPEG image or other protocol. Once the image is obtained, the image is uploaded to the facilities management system via HTTP/MIME protocol at step 704. At step 706, the facilities management system is configured with map location X,Y coordinates. At step 708, the facilities management system is configured for a link for either a web home page or floor map. In other words, a geographical map, a building map or other map, or a floor map, is configured at step 708. At step 710, it is determined whether there are additional units in the nest that need to be mapped. If so, the process proceeds to step 712 to configure the next unit map location X,Y coordinate. At step 714, the unit link is configured for the nest map, floor map, or egg status. In other words, an additional nest map may be configured, or a floor map may be configured. Additionally, if an end unit leak detector system is connected, the status of the end unit leak detector system (the egg) is configured. The process returns to step 710 and cycles through until all units have been mapped. The process then proceeds to step 716 where all the changes are internally saved. At step 718, the process ends.

Figure 8:
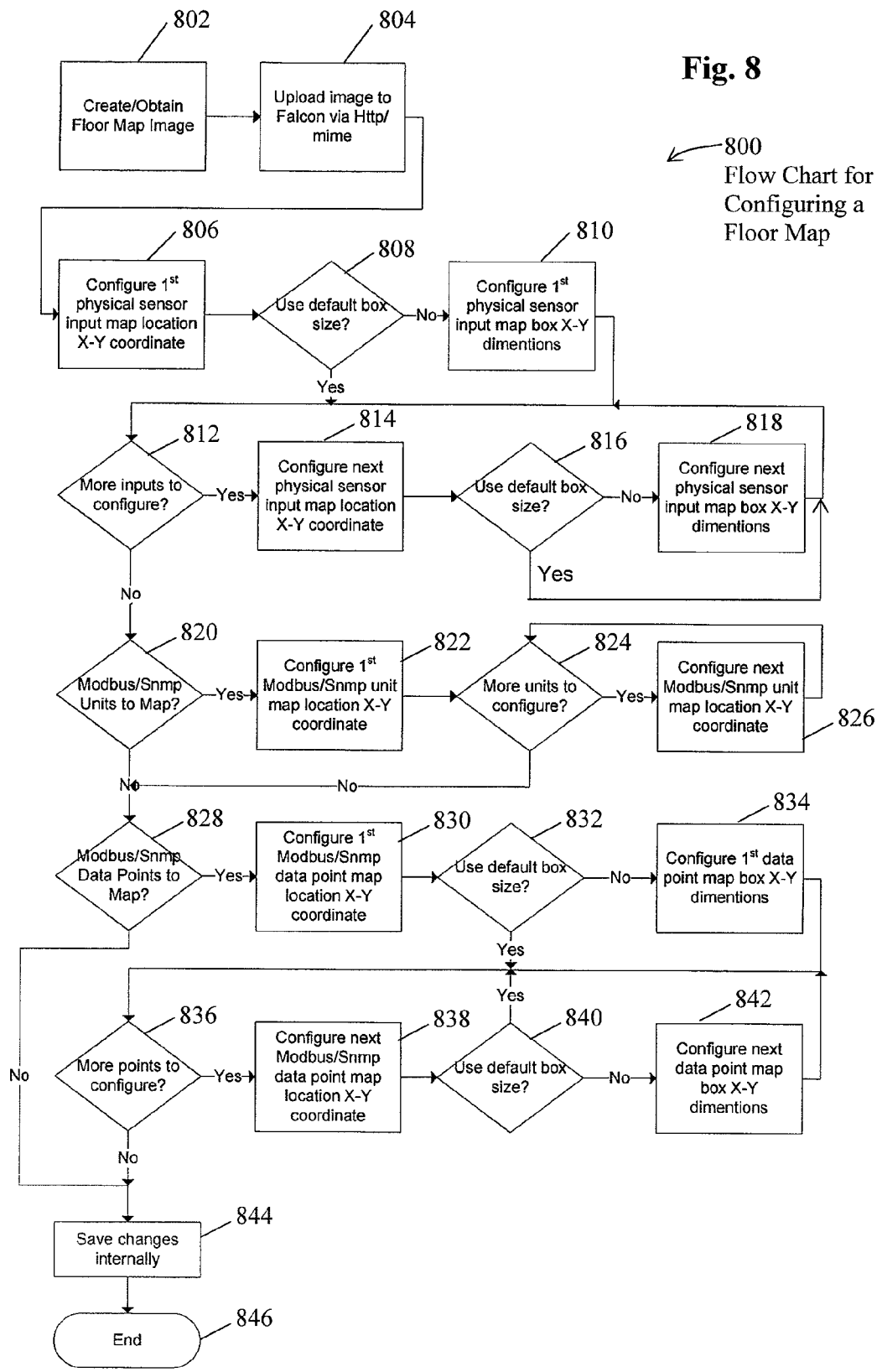
FIG. 8 is an embodiment of a flow diagram for configuring a flow map in a facilities management device.

FIG. 8 is a flow chart for configuring a floor map, such as illustrated in FIGS. 5 and 6. At step 802, a floor map image is either created or obtained. Such an image may be created in a graphics program, scanned from an architectural diagram, created from a picture, etc. At step 804, the image is uploaded to the FMS using an HTTP/MIME format. At step 806, the first physical sensor is configured on the floor map image at an X,Y coordinate. At step 808, it is determined whether a default size for a box should be used for the sensor. If not, the dimensional size of the box or point is configured at step 810. After step 810, or if the default size for the sensor is to be used, the process proceeds to step 812 where it is determined if there are more sensors to configure. If there are more sensors to configure, the process proceeds to step 814 where the next physical sensor is configured on the floor map at specific X,Y coordinates. At step 816, it is determined whether to use the default size for the sensor box. If not, the process proceeds to step 818 to configure the size of the sensor on the floor map by specifying the X,Y dimensions. If it is determined that the default sizes are to be used, the process returns to step 812 to determine if there are more inputs to configure. Additionally, after configuring the dimensions at step 818, the process returns to step 812 to determine if there are more inputs to configure. If there are no more inputs to configure, the process proceeds to step 820. At step 820, it is determined whether there are any Modbus or SNMP units to map.

At step 820, it is determined whether a Modbus or SNMP units are to be mapped. If so, the process proceeds to step 822 to configure the first Modbus or SNMP unit map location using X,Y coordinates of the unit on a map, such as a geographical map. The process then proceeds to step 824 to determine if there are more units to configure. If there are more units to configure, the process proceeds to step 826 to configure the next Modbus or SNMP unit on the geographical map at the proper location. This process loops through until all of the units are configured on the geographical map. After all the units are placed on the map, the process proceeds to step 828. At step 828, it is then determined if Modbus or SNMP data points are to be configured on a floor map. If so, the process proceeds to step 830, where the first Modbus or SNMP data point is configured at the X,Y coordinate on the floor map. At step 832, it is determined whether a standard default size box should be used for the data points. If not, the process proceeds to step 834, where the first data point is configured with custom X,Y dimensions. The process then proceeds to step 836 to determine if there are more points to configure. Also, if it is determined at step 832 that a standard default size box is to be used, the process proceeds directly to step 836. If there are more points to configure at step 836, the process proceeds to step 838, where the next Modbus or SNMP data point is placed in the proper X,Y location on the floor map. At step 840, it is determined whether a default box size should be used for the next data point on the floor map. If so, the process returns to step 836. If not, the process proceeds to step 842, where a custom size box is configured for the sensor on the floor map. Once all the sensors have been configured on the floor map, the process proceeds to step 844 to save these changes in the map database 178 (FIG. 2). Additionally, if there are no Modbus or SNMP data points to configure on a map at step 828, the process proceeds directly to step 844 to save the changes. At step 846, the process ends.

Figure 9:
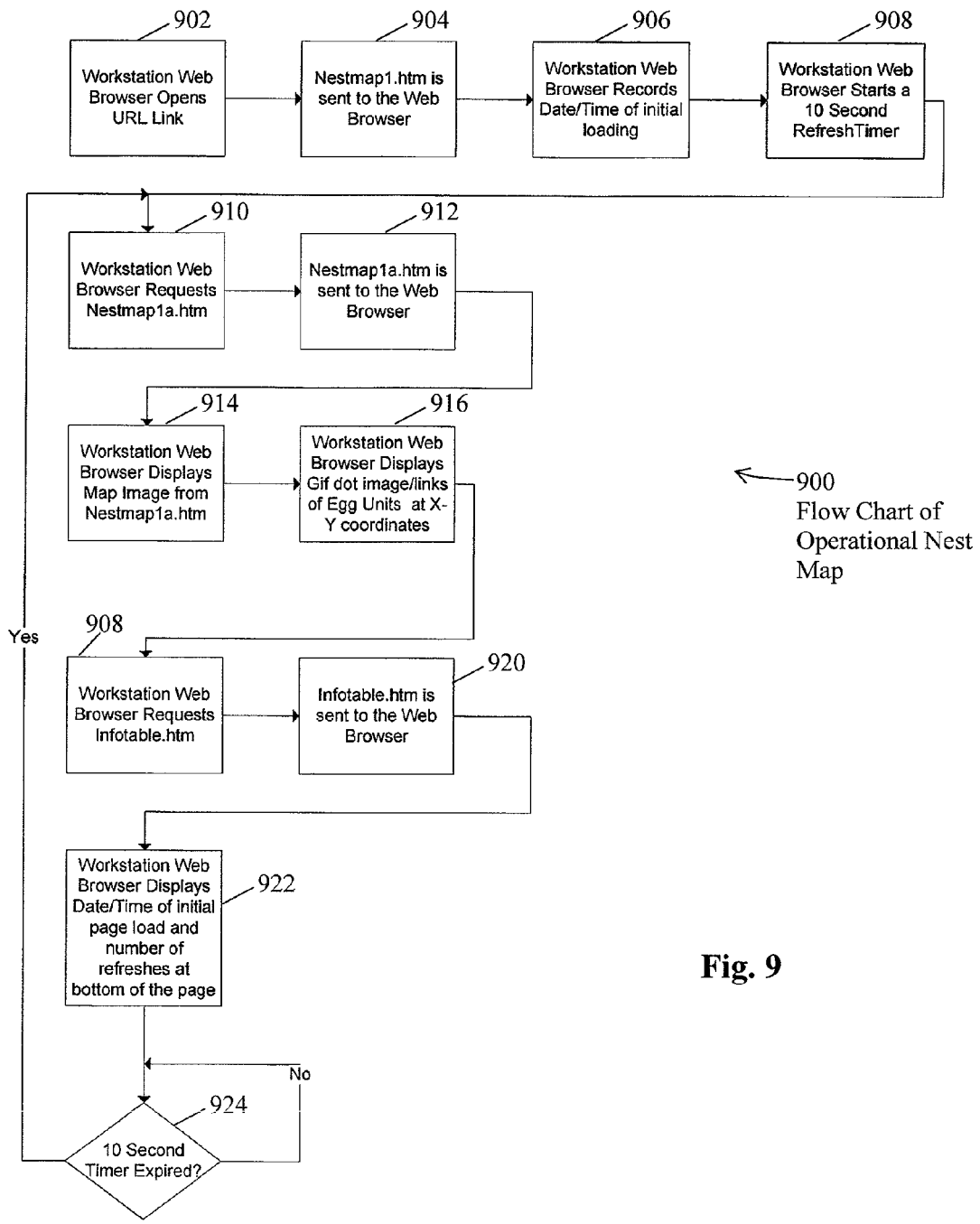
FIG. 9 is an embodiment of a flow diagram for operation of a nest map.

FIG. 9 is a flow chart that illustrates the operation of the nest map features. As illustrated in FIG. 9, the work station web browser 118 opens a URL link to the top level facilities management device 102. At step 904, the top level facilities management devices 102 sends an image (nest map 1.htm), which may be a geographical map, to the web browser 118. At step 906, the web browser 118 records the date and time of the initial loading of the web page (nest map 1.htm). The web browser 118 then starts a ten second refresh timer at step 908. At step 910, the web browser 118 drills down in the web page and clicks on a link, such as a link at a specific geographical location, such as link 404 of FIG. 4, to retrieve the web page (nest map 1A.htm) located at one of the links, such as link 404, from the facilities management system located in St. Augustine, Fla. The facilities management system located in St. Augustine, Fla., sends the image (nest map 1A.htm), such as a floor map, from the embedded map database 182 of the facilities management device located in St. Augustine, Fla., to the web browser 118, which may be located in Fort Collins, Colo. At step 914, the web browser 118 displays the map image (nest map 1A.htm) in Fort Collins, Colo., that is embedded in the facilities management system located in St. Augustine, Fla., so that administrator 132 can determine the status of all of the sensors from the floor map of the building located in St. Augustine, Fla. At step 916, the web browser 118 may also display geographical images and links of various end unit monitoring systems, such as those located in Los Angeles, Calif., at link 410 of FIG. 4, at various locations and buildings in Anaheim, Calif. At step 918, the web browser 118 requests infotable.htm information, which is displayed on the image, such as infotable 530 illustrated in FIG. 5. At step 920, the infotable.htm information is sent to the web browser 118 for display, such as infotable information 530, illustrated in FIG. 5. At step 922, the web browser 118 displays the date and time of the initial page load and the number of refreshes that have occurred. Again, this information is shown as the data 530 in FIG. 5. The process then proceeds to step 924 where it is determined if the ten second timer has expired. If not, the process recycles and a refresh occurs at every ten seconds.

Figure 10:
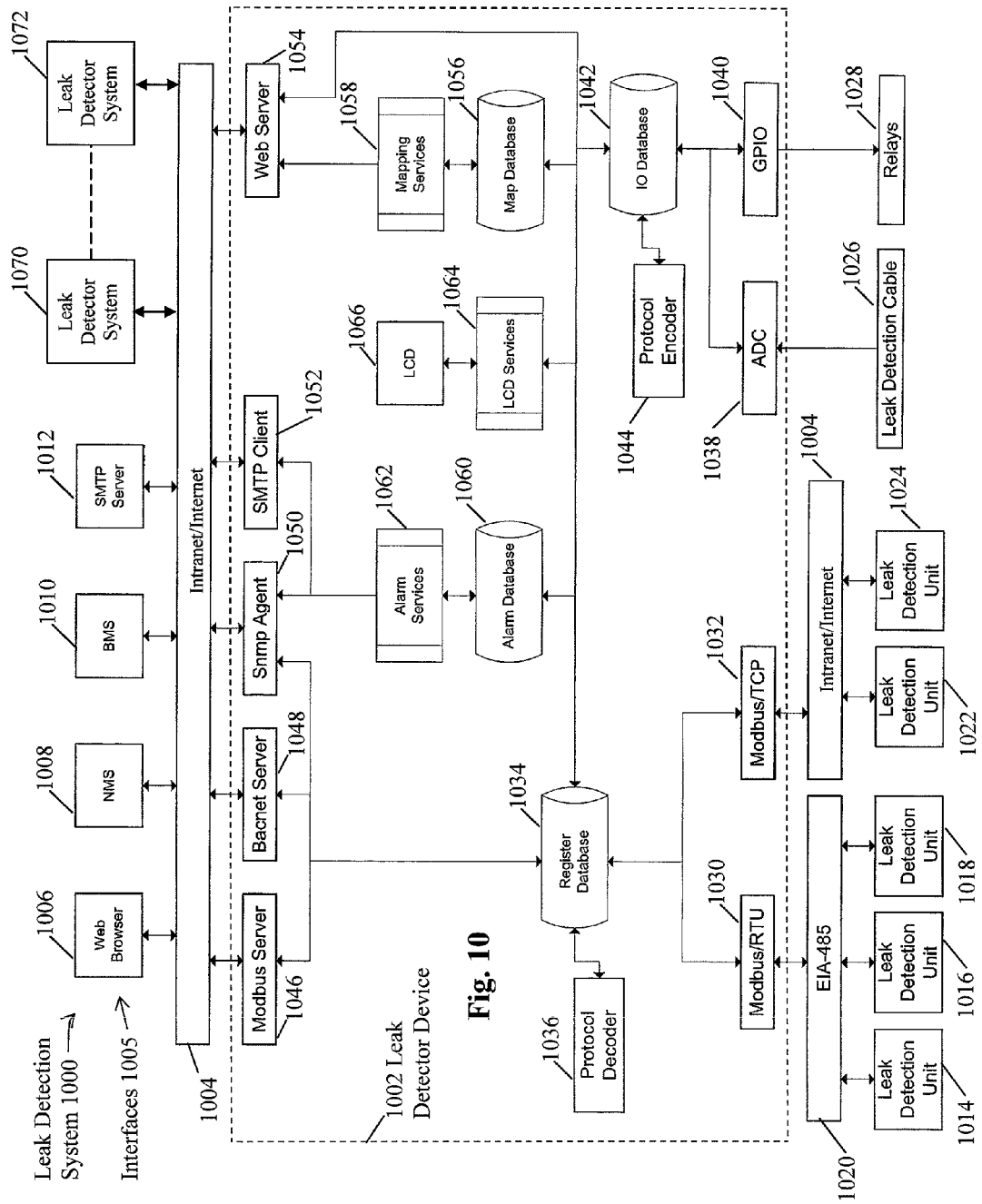
FIG. 10 is a schematic illustration of an embodiment of a leak detection system.

FIG. 10 is a schematic illustration of a leak detection system 1000. The leak detection system 1000 includes a leak detector device 1002 that is connected to a network, such as an Intranet or Internet 1004, which, in turn, is connected to a plurality of interfaces 1005. Additionally, the leak detector device 1002 is coupled to various detectors 1007. The system illustrated in FIG. 10 is similar to the facilities management system 100, illustrated in FIGS. 1 and 2. In that regard, the interfaces 1005 include a web browser 1006, a network management system 1008, a building management system 1010, and an email server, SMTP server 1012. In addition, nested leak detector systems 1070, 1072 can be connected in the same manner as the nested facilities management system illustrated in FIG. 2.

As also illustrated in FIG. 10, various leak detection units 1014, 1016, 1018 can be connected to an EIA-485 module 1020. Additionally, leak detector units 1022, 1024 can be connected to a network, such as an Intranet or Internet 1004. The EIA-485 is a physical layer protocol for serial connection to the Modbus for remote terminal unit 1030. A remote terminal unit is a microprocessor controlled electronic device that interfaces with the physical layer EIA-485 terminal 1020. Data from leak detection units 1022, 1024 is transmitted through the network 1004 to the Modbus or TCP protocol 1032 for storage in register database 1034, as disclosed above. The protocol decoder 1036 operates in conjunction with the register database 1034, as described above. Modbus server 1046 retrieves data from the register database 1034, and communicates primarily with the building management system 1010, but can interface with the web browser 1006, or network management system 1008, with a translator. Similarly, BACnet server 1048 communicates through the network 1004 primarily to the building management system 1010, but may interface with the network management system 1008, or the web browser 1006, with an appropriate interface device. SNMP agent 1050 couples primarily to the web browser 1006, but may also connect to the other interfaces 1005. The alarm database 1060 functions in conjunction with the alarm services 1062 to generate an alarm that is transmitted to the SNMP agent 1050, or the SMTP client 1052. This SMTP client 1052 transmits an alarm to the SMTP server 1012, which generates an email that is sent to a distribution list indicating that an alarm condition exists. SNMP agent transmits the alarm to the web browser 1006, but may interface with the network management system 1008 and the building management system 1010 to also transmit information regarding an alarm condition. Leak detection cable 1076 is coupled to an analog to digital converter 1038, which digitizes the signal which is stored in the I/O database 1042. Protocol encoder 1044 functions with the I/O database 1042 in the manner described above. Similarly, relays 1028 function in conjunction with the general purpose I/O device 1040. I/O database 1042 stores information regarding relays 1028. In addition, the I/O database 1042 can transmit information to activate relays 1028. The LCD services 1064 function in conjunction with an LCD 1066 that is located on the face of the leak detector device 1002. The LCD 1066 may be interactive, so that data can be entered into the system via LCD 1066. Web server 1054 interfaces through the network 1004 with web browser 1006 using standard HTTP protocol. HTML web pages are generated by the map database 1056 and mapping services 1058 that are transmitted through the web server 1054 to the web browser 1006. In addition, links can be included in the interactive HTML web page via web browser 1006, in the manner described above. Further, additional nested leak detection systems 1070-1072 can be connected to the leak detector device 1002 via network 1004. The nesting of the leak detector system 1070, 1072 can occur in the same manner as described above with respect to FIG. 2. In other words, multiple levels of nesting can occur and links can be provided on geographical maps, floor maps, and other maps that are generated on an HTML web page that is embedded in the map database 1056 of the leak detector device 1002, and each of the leak detector systems 1070-1072. Accordingly, nesting can occur in the same manner using the leak detection system 1000, as described with respect to the facilities management system.

In that regard, the leak detection system 1000, disclosed in FIG. 10, can certainly be combined with the facilities management system 100 of FIG. 2 to provide both leak detection functions and facilities management functions.

Figure 11:
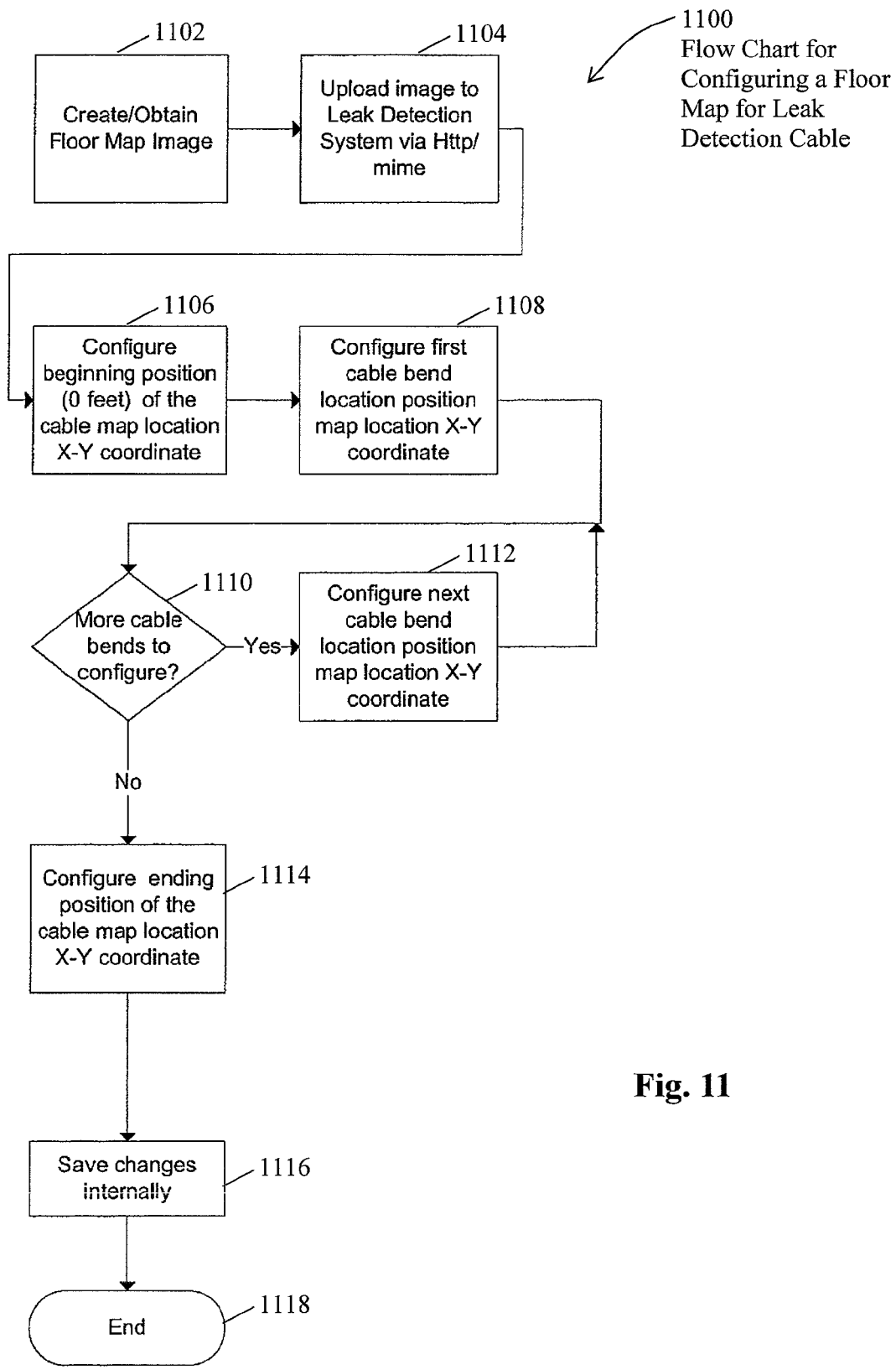
FIG. 11 is an embodiment of a flow diagram for configuring a floor map for a leak detection cable.

FIG. 11 is a flow chart 1100 for configuring a floor map for a leak detection cable. As disclosed in FIG. 11, an image is created of a floor map in the manner described above. The image can be a JPEG, GIF, or other image that can be generated by the user, or scanned from an architectural drawing. The image is uploaded to the leak detection system via HTTP/MIME protocol at step 1104. At step 1106, the beginning position of a cable is configured on the image. At step 1108, the first cable bend location position is located on the floor map by clicking on a particular location on the floor map. At step 1110, it is determined if there are more cable bends to configure. If there are more cable bends, the next cable bend is configured on the floor map, at step 1112. This process proceeds until all of the bends in the cable are configured on the floor map. The process then proceeds to step 1114, where the end position of the cable is configured on the floor map. At step 1116, these changes are stored internally in the map database 1056 of the leak detector device 1002. The process then ends at step 1118.

Figure 12:
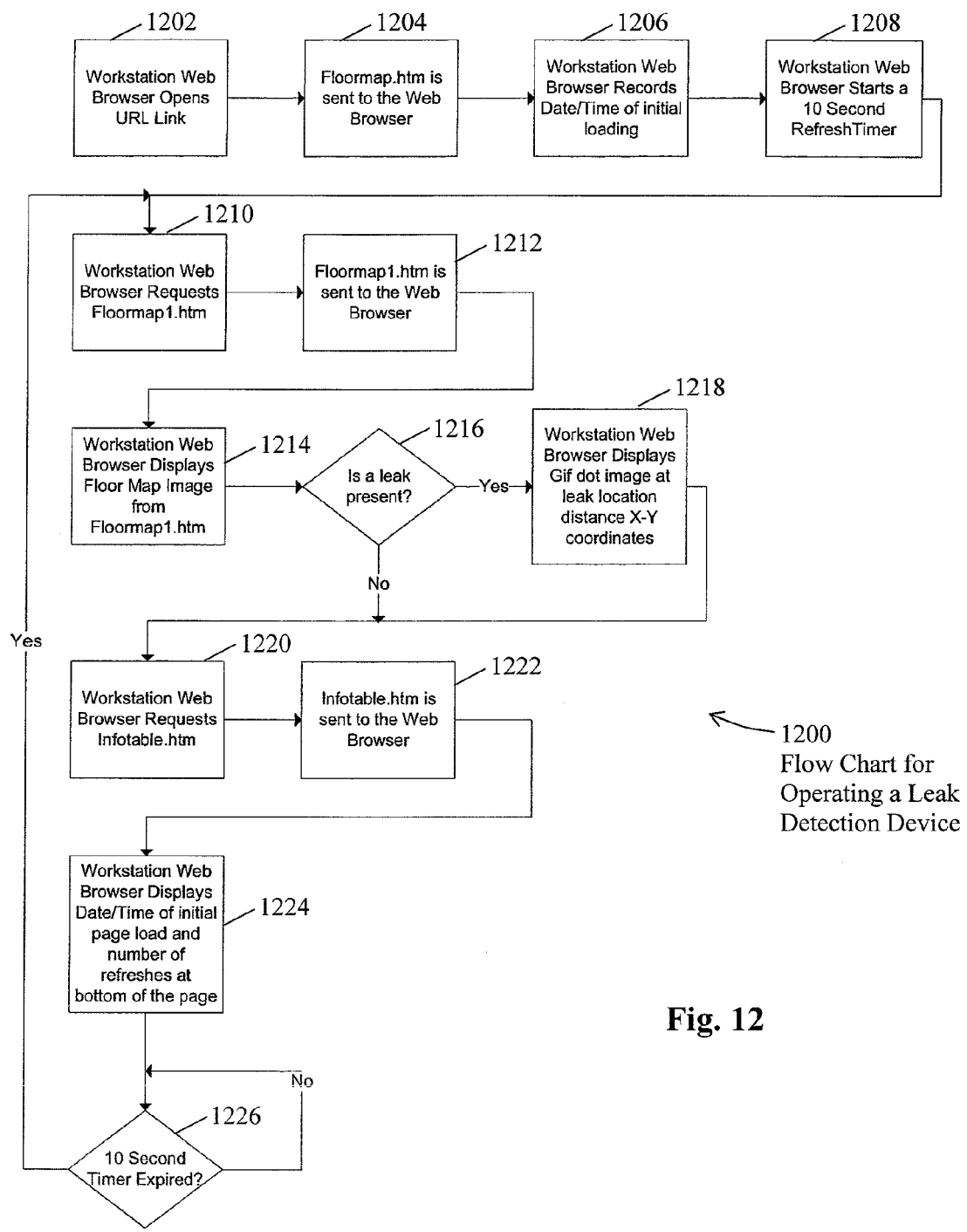
FIG. 12 is an embodiment of a flow diagram for operating a leak detection device.
Figure 13:
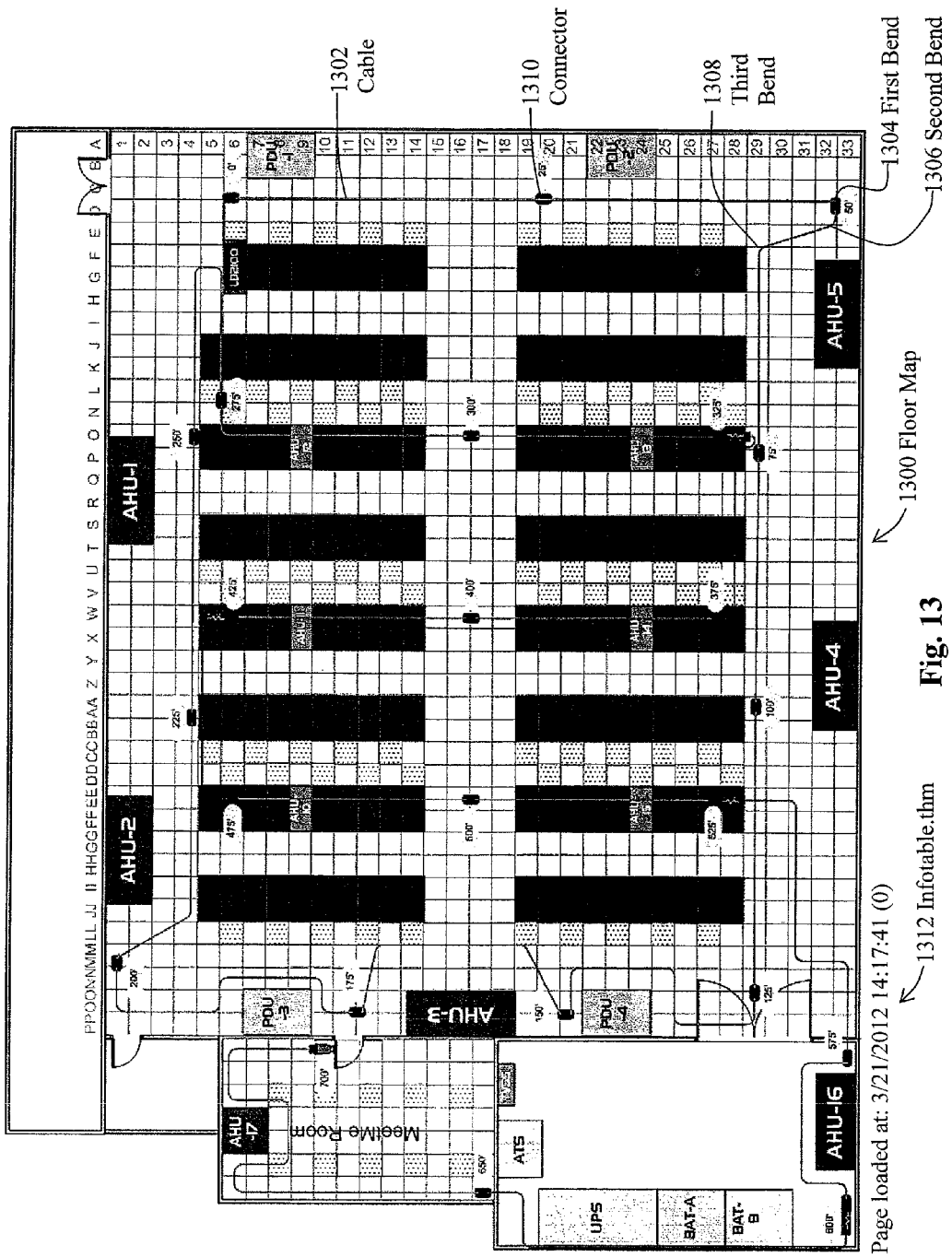
FIG. 13 is an example of a floor map illustrating the layout of a leak detection cable.

FIG. 12 is a flow chart 1200 for operating a leak detection device, such as illustrated in FIG. 10. At step 1202, the web browser 1006 opens a URL link to the web server 1054 at the IP address of the web server 1054. At step 1204, the floor map is sent to the web browser 1006 from the web server 1054 that is stored in map database 1056. The web browser 1006 records the date and time of the initial loading of the floor map. At step 1208, the work station web browser starts a ten second refresh timer. At step 1210, the web browser 1006 requests another floor map from another leak detector (floor map1.htm). At step 1212, the additional image is sent to the web browser 1006. At step 1214, the web browser 1006 displays the additional floor map image (floor map1.htm). At step 1216, it is determined whether a leak is present. If no leak is present, the process proceeds to step 1220. If a leak is present, the web browser 1006 displays a dot on the image at the location of the leak. The process then proceeds to step 1220, where the web browser requests infotable.htm information 1312 (FIG. 13). The infotable.htm information is similar to the infotable information 530 of FIG. 5, which indicates the date and time that the web page was loaded by the web browser. In addition, the number within the parentheses indicates the number of refreshes that have occurred of the infotable information. At step 1222, the infotable.htm information is sent to the web browser 1006. At step 1224, the web browser 1006 displays the infotable information 1312 (FIG. 13), which is the date and time of the initial page load and the number of refreshes that have occurred. The process then proceeds to step 1226 to determine if the ten second timer has expired. If not, the process keeps looping until the ten second timer has expired. The process then returns to step 1210.

FIG. 13 is a schematic illustration of a floor map 1300. As shown in FIG. 13, a leak detector cable 1302 is disposed in the control room illustrated in FIG. 13. The first bend 1304 is identified on the floor map 1300 using the graphic techniques for placing the bends on the cable 1302. A second bend 1306 is also located on the floor map 1300. A third bend 1308 is further located on the cable 1300. This process proceeds until all of the cable bends are located and recorded on the image of the floor map 1300. The location of the cable connectors 1310 is also provided on the map, so that, if a problem exists with the cable, such as if the cable has detected a leak and is no longer usable, a cable section can easily be replaced using the connectors. FIG. 13 also indicates the infotable.htm information 1312 that is generated and displayed on the floor map 1300. The infotable information ensures to the viewer that the information provided on the image is up-to-date and current.

Accordingly, a facilities management system provides embedded maps with links in facilities management devices that are connected to a network. Links are provided on map images that allow a user of the system to locate a sensor that has gone into an alarm condition. Multiple levels of facilities management devices can be provided with various types of image maps to guide the user to a location of an alarmed sensor. The links on the image maps also indicate the existence of an alarm condition for each string of links. This allows a user to immediately identify alarm conditions and drill down through the various links to identify the location of an alarmed sensor.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of monitoring and managing systems in a facility comprising:
   connecting a first level facilities management device to a network with an address on said network, the first level facilities management device including a first web server coupled to at least one or more databases;
   embedding a first map image in said first level facilities management device;
   connecting additional facilities management devices at additional connection levels to said network that have additional addresses on said network, the additional facilities management devices respectively including additional web servers coupled to at least one or more additional databases;
   embedding additional map images in said additional facilities management devices by accessing said additional addresses;
   placing at least one first level embedded link on said first embedded map image that links to at least one of said additional web servers of said additional facilities management devices, said at least one first level embedded link disposed on said first embedded map image at a position that indicates a location of at least one of said additional facilities management devices and an operational state of a sensor coupled to said at least one of said additional facilities management devices, wherein the first embedded map image is to be supplied to a web browser by said first web server, and wherein content accessed by opening said at least one first level embedded link on said first embedded map image using said web browser is supplied to said web browser by a respective one of said additional web servers of said additional facilities management devices associated with said embedded link;

placing at least one additional level embedded link on said additional embedded map images that links to said at least one of the group comprising said additional facilities management device and a sensor, said at least one additional level embedded link disposed on said additional embedded map images at a location of at least one of the group comprising said additional facilities management device and said sensor and an operational state of at least one of the group comprising a sensor linked to said additional facilities management device and said sensor, wherein content accessed by opening said at least one additional level embedded link on said additional embedded map images by said web browser is supplied to said web browser by a corresponding additional web server of said at least one of said additional facilities management devices associated with said additional level embedded link; and wherein:

the first level facility management device is the first level device of a nesting network comprising the first level facility management device and the additional facility management devices, said additional facility management devices linked with said first level facility management device in a hierarchal system; and the respective web server of said facility management device provides the content from said one or more databases to build a web page comprising one or more embedded links for one or more levels of the nesting network.

2. The method of claim 1 wherein said process of embedding a first map comprises:

embedding a first geographical map that indicates a location of said additional facilities management devices.

3. The method of claim 2 wherein said process of embedding additional map images comprises:

embedding additional map images that indicate a location of sensors attached to said at least one additional facilities management devices.

4. The method of claim 2 wherein said process of embedding additional map images comprises:

embedding additional geographical map images that indicate a location of said additional facilities management devices.

5. A facilities management system comprising:

a first level facilities management device to connect to a network at a specified address, the first level facilities management device to contain a first embedded map image the first level facilities management device to include a first level web server;

additional facilities management devices to connect to said network at additional connection levels to said first level facilities management device, the additional facilities management devices to have additional embedded map images, the additional facilities management devices to respectively include additional web servers;

at least one first level embedded link to be displayed on said first embedded map image that links to at least one of said additional web servers of said additional facilities management devices, said at least one first level embedded link disposed on said first embedded map image at a position that indicates a location of said at least one of said additional facilities management devices and an operational stage of a sensor linked to said at least one of said additional facilities management devices, wherein the first embedded map image is to be supplied to a web browser by said first web level server, and wherein content accessed by opening said at least one first level embedded link by said web browser is to be supplied to said web browser by a corresponding additional web server of said at least one of said additional facilities management devices;

at least one additional level embedded link to be displayed on said additional embedded map images that links to said at least one of the group comprising said additional facilities management device and a sensor, said at least one additional level embedded link to be displayed on said additional embedded map images at a location of at least one of the group comprising said additional facilities management device and said sensor and an operational state of at least one of the group comprising a sensor linked to said additional facilities management device and said sensor, wherein content accessed by opening at least one additional level embedded link by said web browser is supplied to said web browser by a corresponding additional web server of said at least one of said additional facilities management devices; and wherein:

the first level facility management device is the first level device of a nesting network comprising the first level facility management device and the additional facility management devices, said additional facility management devices linked with said first level facility management device in a hierarchal system; and the respective web server of said facility management device provides the content from said one or more databases to build a web page comprising one or more embedded links for one or more levels of the nesting network.

6. The facilities management system of claim 5 wherein said first embedded map image is a first geographical map.

7. The facilities management system of claim 6 wherein said additional embedded map images are selected from the group comprising a second geographical map and a sensor map.

8. The facilities management system of claim 6 wherein said additional embedded map images comprise at least one second geographical map and at least one sensor map.

* * * * *